Figure 1:
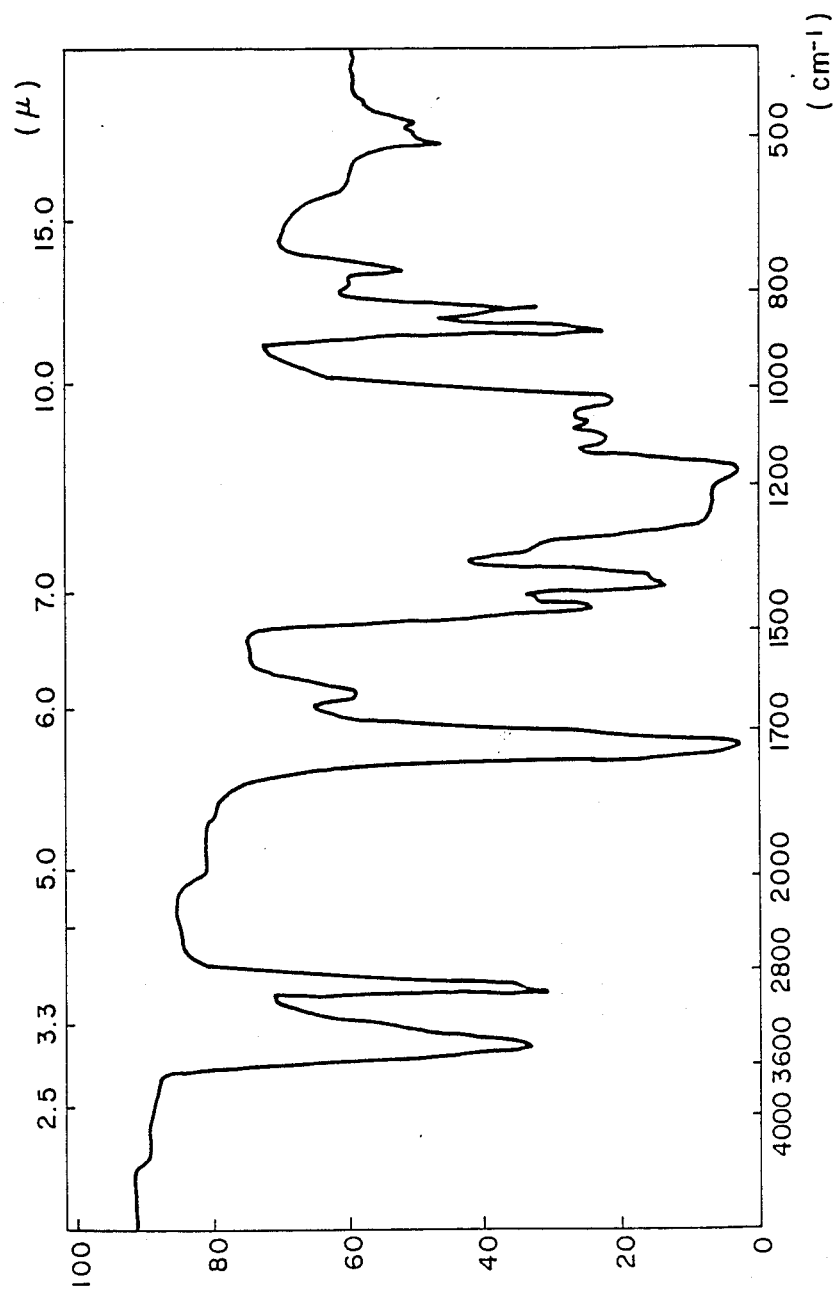

United States Patent [19]

Miyabayashi et al.

[11] Patent Number: 4,925,907
[45] Date of Patent: May 15, 1990

[54] VINYLIDENE FLUORIDE-ACRYLIC ACID ESTER COPOLYMER, PROCESS FOR PRODUCING THE SAME AND COMPOSITION CONTAINING THE SAME

[75] Inventors: Toshio Miyabayashi; Nobuyuki Sakabe; Shinichiro Zen, all of Yokkaichi, Japan

[73] Assignee: Japan Synthetic Rubber Co., Ltd., Tokyo, Japan

[21] Appl. No.: 334,568

[22] Filed: Apr. 7, 1989

Related U.S. Application Data

[62] Division of Ser. No. 145,103, Jan. 19, 1988, Pat. No. 4,861,851.

[30] Foreign Application Priority Data

Jan. 22, 1987 [JP] Japan ................................. 62-12931

[51] Int. Cl.$^5$ ............................................. C08F 14/18
[52] U.S. Cl. .................................... 526/255; 526/279; 526/320; 526/328; 526/335; 525/326.3
[58] Field of Search ............... 526/255, 279, 320, 328, 526/335; 525/326.3

[56] References Cited

U.S. PATENT DOCUMENTS 3,824,126  7/1974  Katsushima et al. ........ 117/139.5 R
4,115,480  9/1978  Kinoshita et al. ................... 260/885

Primary Examiner—Joseph L. Schofer
Assistant Examiner—A. Sarofim
Attorney, Agent, or Firm—Oblon, Spivak, McClelland, Maier & Neustadt

[57] ABSTRACT

A substantially random, linear vinylidene fluoride-acrylic acid ester copolymer comprising:
(A) 5–85% by weight of a vinylidene fluoride unit,
(B) 15–95% by weight of at least one unit selected from the group consisting of an alkyl acrylate unit and an alkoxy-substituted alkyl acrylate unit, and
(C) optionally 10% by weight or less, based on the total weight of (A), (B) and (C), of a crosslinking monomer unit, and having an intrinsic viscosity of 0.01–10 dl/g as measured at 30° C. in N,N-dimethylformamide. Said copolymer has not only excellent heat resistance, ozone resistance and sour gasoline resistance but also excellent resistance to gasoline permeation.

2 Claims, 2 Drawing Sheets

VINYLIDENE FLUORIDE-ACRYLIC ACID ESTER COPOLYMER, PROCESS FOR PRODUCING THE SAME AND COMPOSITION CONTAINING THE SAME

This is a division of application Ser. No. 145,103, filed January 19, 1988, now U.S. Pat. No. 4,861,851.

This invention relates to a novel vinylidene fluoride-acrylic acid ester copolymer, a process for producing the same and a composition containing the copolymer. More particularly, this invention relates to a vinylidene fluoride-acrylic acid ester copolymer comprising, as the essential constituents, a vinylidene fluoride unit and an acrylic acid ester unit and having excellent gasoline resistance, as well as to a process for the production of said copolymer and a composition containing the copolymer.

In recent years, gasoline-resistant rubbers as an automobile part are in use at ambient temperatures which becomes increasingly higher due to counter-measures to clear the exhaust gas regulations and engine modifications for higher performance. Hence, a gasoline (oil)-resistant rubber with excellent heat resistance and ozone resistance has been required. With respect to these gasoline-resistant rubbers, there is a further problem that gasoline is oxidized owing to its use at such higher temperatures to produce sour gasoline [the sour gasoline refers to a gasoline containing peroxides formed by gasoline oxidation and it is described in detail in A. Nersasian, Rubber and Plastics News, June 26 (1978)], whereby the gasoline-resistant rubbers are deteriorated.

Further, as the regulation for hydrocarbon vapors escaping from automobiles became stricter for the prevention of environmental pollution, a rubber with excellent resistance to gasoline permeation, i.e., a rubber which gasoline hardly permeates has been required.

Butadiene-acrylonitrile rubber has widely been used as gasoline-resistant rubbers in hoses, gaskets, O-rings, packings, oil seals and the like.

However, the butadiene-acrylonitrile rubber is inferior in ozone resistance and insufficient in heat resistance and sour gasoline resistance, and therefore, it has been difficult to obtain from said rubber a rubber part having a sufficient reliability especially when being used in contact with gasoline at high temperatures as mentioned above.

On the other hand, fluororubber has been spotlighted as a gasoline-resistant rubber material because of its excellency in sour gasoline resistance, ozone resistance, heat resistance and resistance to gasoline permeation. However, the fluororubber has a poor flexibility at low temperatures and inferior physical properties in the normal state, and is difficult to handle and very expensive. Accordingly, it cannot be used as a general purpose gasoline-resistant rubber.

Acrylic rubber is also used as a material having excellent oil resistance, heat resistance and ozone resistance. However, the acrylic rubber is inferior in gasoline resistance and resistance to gasoline permeation and accordingly is unsuitable for use in gasoline-resistant rubber parts which must withstand the recent severe conditions. Hence, the improvement of the acrylic rubber in said properties is desired.

As a means for improving such physical properties, there was proposed, for example, a vulcanized rubber composition consisting of a mixture of an acrylic type multi-component copolymer rubber and a vinylidene fluoride resin [Japanese Patent Application Kokai (Laid-Open) No. 176,652/86]. This composition has not only excellent sour gasoline resistance, ozone resistance and heat resistance but also excellent physical properties in the normal state and a good processability, and therefore is drawing attention as a gasoline-resistant rubber material well balanced in gasoline resistance and low temperature resistance. However, the composition is insufficient in resistance to gasoline permeation under the regulation for hydrocarbon vapors escaping from automobiles which is inferred to become much stricter in future. Hence, a rubber material having higher resistance to gasoline permeation is required.

The present inventors have made extensive research in order to obtain a gasoline-resistant rubber material which is superior in sour gasoline resistance, ozone resistance and heat resistance and which further has higher resistance to gasoline permeation than conventional gasoline-resistant rubber materials. As a result, it has been found that a novel vinylidene fluoride-acrylic acid ester copolymer elastomer comprising, as essential constituents, (A) vinylidene fluoride and (B) an alkyl acrylate and/or an alkoxy-substituted alkyl acrylate has excellent resistance to gasoline permeation as compared with the above composition consisting of a mixture of a multicomponent acrylic copolymer rubber and a vinylidene fluoride resin.

An object of this invention is to provide a gasoline-resistant rubber material with excellent resistance to gasoline permeation.

Another object of this invention is to provide a process for producing a gasoline-resistant rubber material with excellent resistance to gasoline permeation.

Figure 2A:
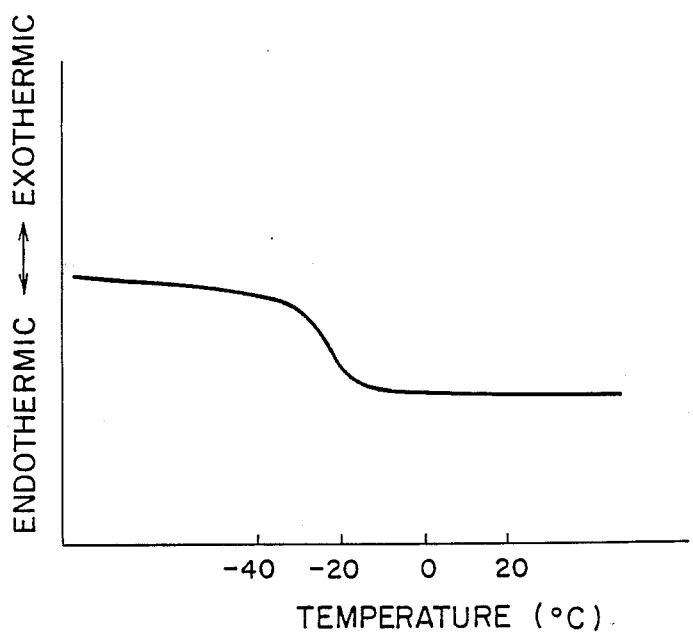
Figure 2B:
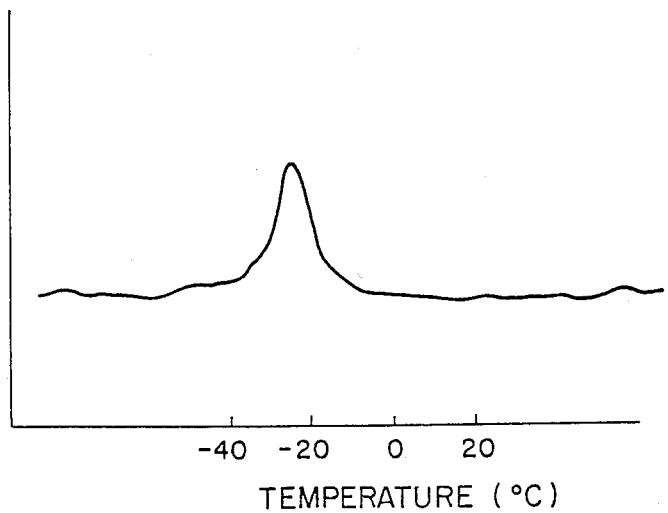

Other objects and advantages of this invention will become apparent from the following description and the accompanying drawings. In the drawings, FIG. 1 shows an infrared absorption spectrum of a vinylidene fluoride-acrylic acid ester copolymer of this invention; FIG. 2a is a DSC chart of a vinylidene fluoride-acrylic acid ester copolymer of this invention, obtained by a differential scanning calorimeter; and FIG. 2b is a differentiation chart from the chart of FIG. 2a.

According to this invention, there is provided a substantially random, linear vinylidene fluoride-acrylic acid ester copolymer comprising as essential constituents:

(A) 5-85% by weight of a vinylidene fluoride unit and (B) 15-95% by weight of an alkyl acrylate unit and/or an alkoxy-substituted alkyl acrylate unit and having an intrinsic viscosity of 0.01-10 dl/g as measured at 30° C. in N,N-dimethylformamide.

This invention further provides a process for producing a vinylidene fluoride-acrylic acid ester copolymer, which comprises copolymerizing a mixture comprising:

(A') 10-95% by weight of a vinylidene fluoride and (B') 5-90% by weight of an alkyl acrylate and/or an alkoxy-substituted alkyl acrylate in the presence of a radical polymerization initiator.

This invention further provides a crosslinkable rubber composition comprising, as essential components, a crosslinking agent and a polymer obtained by polymerizing in the presence of a radical polymerization initiator a mixture of:

(A') 10-95% by weight of a vinylidene fluoride, (B') 4.9-89.9% by weight of an alkyl acrylate, an alkoxy-substituted alkyl acrylate or both of them and (C') 0.1–10% by weight of a crosslinking monomer.

The copolymer of this invention comprises, as essential constituents, (A) a vinylidene fluoride unit and (B) an alkyl acrylate unit and/or an alkoxy-substituted alkyl acrylate unit, and when it is intended to provide a crosslinkable rubber composition, the copolymer also comprises (C) a crosslinking monomer unit as mentioned hereinafter. The copolymer further comprises as an optional constituent (D) an other ethylenically unsaturated monomer unit as mentioned hereinafter.

(A) Vinylidene fluoride unit

The vinylidene fluoride-acrylic acid ester copolymer of this invention comprises, as an essential constituent, a vinylidene fluoride recurring unit represented by $-(CH_2-CF_2)-$. Increase of the content of this unit in the copolymer can enhance the gasoline resistance of the copolymer.

(B) Acrylic acid ester unit

The alkyl acrylate unit and the alkoxy-substituted alkyl acrylate unit are derived from monomers of the following general formulas (I) and (II), and recurring units represented by

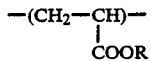

(wherein R is an alkyl group having 1–18 carbon atoms or an alkoxy-substituted alkyl group of 2–24 carbon atoms) are contained in the copolymer:

(1) Alkyl acrylates represented by the general formula (I):

wherein $R^1$ is an alkyl group having 1–18 carbon atoms, preferably 2–8 carbon atoms, for example, methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate and the like, preferably ethyl acrylate, n-propyl acrylate, n-butyl acrylate, n-hexyl acrylate, 2-ethylhexyl acrylate and n-octyl acrylate.

(2) Alkoxy-substituted alkyl acrylates represented by the general formula (II):

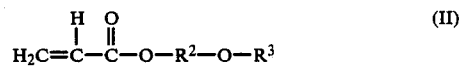

wherein $-R^2-O-R^3$ is an alkoxy-substituted alkyl group, $R^2$ and $R^3$ are alkyl groups which may be the same or different, and the total carbon atoms of $R^2$ and $R^3$ are 2–24, for example, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, 2-(butoxy)propyl acrylate and the like, preferably 2-methoxyethyl acrylate and 2-ethoxyethyl acrylate.

Increasing the content of the unit (B) in the copolymer in the range of 15 to 95% by weight can improve the flexibility of the copolymer.

(C) Crosslinking monomer unit

The unit (C) is derived from a crosslinking monomer which includes, for example, (i) nonconjugated dienes such as alkylidenenorbornenes, alkenylnorbornenes, dicyclopentadiene, methylcyclopentadiene, dimers thereof and the like;

(ii) conjugated dienes such as butadiene, isoprene and the like;

(iii) dihydrodicyclopentadienyl group-containing (meth)acrylic acid esters such as dihydrodicyclopentadienyl (meth)acrylate, dihydrodicyclopentadienyloxyethyl (meth)acrylate and the like;

(iv) active halogen-containing ethylenically unsaturated monomers such as vinylbenzyl chloride, vinylbenzyl bromide, 2-chloroethyl vinyl ether, 2-chloroethyl acrylate, vinyl chloroacetate, vinyl chloropropionate, allyl chloroacetate, allyl chloropropionate, chloromethyl vinyl ketone, 2-chloroacetoxymethyl-5-norbornene and the like;

(v) carboxyl group-containing ethylenically unsaturated monomers such as acrylic acid, methacrylic acid, crotonic acid, 2-pentenoic acid, maleic acid, fumaric acid, itaconic acid and the like;

(vi) epoxy group-containing ethylenically unsaturated monomers such as allyl glycidyl ether, glycidyl (meth)acrylate and the like; and (vii) vinyl group-containing organosilicon-containing ethylenically unsaturated monomers represented by the general formula:

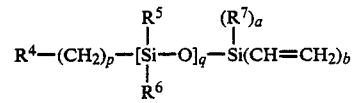

wherein $R^4$ is a monovalent organic group having at least one polymerizable olefinic unsaturation, $R^5$ and $R^6$ are independently hydrogen atoms or alkyl groups, $R^7$ is an alkyl group, a hydrogen atom, a hydroxyl group or a hydrolyzable group other than halogen atoms, p is an integer of 0–10, q is an integer of 0–50, n is an integer of 0–2, b is an integer of 1–3, and a+b=3. Among these monomers, preferred are active halogen-containing ethylenically unsaturated monomers and carboxyl group-containing ethylenically unsaturated monomers.

The copolymer of this invention is modified into a crosslinkable copolymer by introducing a small amount of the unit (C) into the copolymer by copolymerization.

(D) Other ethylenically unsaturated monomer unit

Various monomers may, if necessary, be used for introducing the unit (D), and examples of the monomers include, for example, (a) alkyl methacrylates such as methyl methacrylate, octyl methacrylate and the like;

(b) alkyl vinyl ketones such as methyl vinyl ketone and the like;

(c) alkyl vinyl ethers and alkyl allyl ethers such as vinyl ethyl ether, allyl methyl ether and the like;

(d) alkenyl aromatic compounds such as styrene, alpha-methylstyrene, chlorostyrene, vinyltoluene and the like;

(e) alkenylnitriles such as acrylonitrile, methacrylonitrile and the like;

(f) alkenylamides such as acrylamide, methacrylamide, N-methylolacrylamide and the like; and (g) other ethylenically unsaturated monomers such as vinyl chloride, vinylidene chloride, alkyl fumarates, hexafluoropropene, pentafluoropropene, trifluoroethylene, trifluorochloroethylene, tetrafluoroethylene, vinyl fluoride, perfluoro(methyl vinyl ether), perfluoro(propyl vinyl ether), vinyl acetate, ethylene, propylene and the like.

The above monomers (a) to (g) may be selected as the (D) unit depending upon purposes of the copolymer.

The vinylidene fluoride-acrylic acid ester copolymer of this invention can be produced by copolymerizing a mixture of (A') 10-95% by weight of vinylidene fluoride, (B') 5-90% by weight of an alkyl acrylate and/or an alkoxy-substituted alkyl acrylate, (C') 0-10% by weight, preferably 0.1 to 10% by weight of a crosslinking monomer and (D') 0-40% by weight, preferably 0-10% by weight of another ethylenically unsaturated monomer copolymerizable with (A'), (B') and (C') in the presence of a radical polymerization initiator batchwise, semicontinuously or continuously accoring to a known polymerization method such as emulsion polymerization, suspension polymerization, solution polymerization or bulk polymerization. Emulsion polymerization is preferred.

The radical polymerization initiator includes acyl peroxides such as acetyl peroxide, benzoyl peroxide and the like; ketone peroxides such as methyl ethyl ketone peroxide, cyclohexane peroxide and the like; hydroperoxides such as hydrogen peroxide, t-butyl hydroperoxide, cumene hydroperoxide and the like; dialkyl peroxides such as di-t-butyl peroxide, dicumyl peroxide and the like; alkyl peresters such as t-butyl peracetate, t-butyl perpivalate and the like; azo compounds such as azobisisobutyronitrile, azobisvaleronitrile and the like; and persulfuric acid salts such as amonium persulfate, potassium persulfate and the like. If necessary, inorganic reducing agents such as sodium hydrogen sulfite, sodium pyrosulfite and the like and organic reducing agents such as cobalt naphthenate, dimethylaniline and the like may also be used.

The copolymerization is conducted usually at a temperature of $-20°$ C. to $120°$ C., preferably of $0°$ C. to $120°$ C. The pressure at the start of the copolymerization is usually 1-150 kg/cm$^2$G, preferably 10-100 kg/cm$^2$G.

The copolymer produced can be collected from the reaction mixture according to a conventional coagulation method using a metal salt such as calcium chloride or the like or using a nonsolvent such as ethanol, methanol or the like.

The vinylidene fluoride-acrylic acid ester copolymer of this invention comprises a vinylidene fluoride unit and an acrylic acid ester unit bonded to each other substantially at random and is substantially linear. It is generally a polymer, particularly an elastomer, having a glass transition temperature of $0°$ C. or less, preferably $-10°$ C. or less, more specifically, an elastomer. The form of the copolymer is not critical and can be solid or liquid depending upon the application of the copolymer. The molecular weight of the vinylidene fluoride-acrylic acid ester copolymer of this invention usually corresponds to an intrinsic viscosity of about 0.01-10 dl/g, preferably about 0.05-5 dl/g as measured at $30°$ C. in N,N-dimethylformamide. When it is used in the form of a solid such as a rubber elastomer, the molecular weight of the copolymer corresponds preferably to a Mooney viscosity (ML$_{1+4}$, $100°$ C.) of 20-150.

The proportions of the units (A), (B), (C) and (D) in the vinylidene fluoride-acrylic acid ester copolymer of this invention are generally such that the unit (A) is 5-85% by weight, the unit (B) is 15-95% by weight, the unit (C) is 0-10% by weight and the (D) unit is 0-30% by weight based on the total weight of the units (A), (B), (C) and (D) (the same applies hereinafter), and preferably such that the unit (A) is 5-80% by weight, the unit (B) is 20-95% by weight, the unit (C) is 0.1-10% by weight and the unit (D) is 0-10% by weight.

When the proportion of the unit (A) is less than 5% by weight, the resulting copolymer has inferior resistance to gasoline permeation. When the proportion is more than 85% by weight, the copolymer becomes too hard. When the proportion of the unit (B) is less than 15% by weight, the resulting copolymer becomes too hard. When the proportion is more than 95% by weight, the copolymer has inferior resistance to gasoline permeation. When it is desired to obtain a crosslinkable rubber composition by introducing the unit (C), the amount of the unit (C) of less than 0.1% by weight requires a longer time for the crosslinking, and the amount of more than 10% by weight results in a hard rubber having a reduced elongation of crosslinked rubber. When the proportion of the unit (D) as an optional constituent is more than 30% by weight, the balance of physical properties of the resulting copolymer cannot be kept.

The vinylidene fluoride-acrylic acid ester copolymer of this invention may contain, if necessary, conventional additives such as a crosslinking agent, a crosslinking accelerator, a reinforcing agent, a filler, a plasticizer, a softening agent, an antioxidant, a stabilizer, a foaming agent and the like.

As the crosslinking agent, an appropriate compound can be selected depending upon the type of the crosslinking functional group already introduced into the copolymer. For example, when the copolymer has an active halogen atom resulting from an active halogen-containing monomer, there can be used a polyamine carbamate, an ammonium salt of an organic carboxylic acid, or a combination of an alkali metal salt of an organic carboxylic acid and a sulfur compound. When carboxyl groups are introduced into the copolymer by copolymerizing a carboxyl group-containing monomer, a combination of an organic amine compound, a polyvalent metal or a glycidyl group-containing polyepoxy compound with an accelerator may be used. Further, a combination of a crosslinking functional group and a crosslinking agent (this combination is commonly used in acrylic rubber) can widely be applied to the copolymer of this invention. The copolymer of this invention can easily be converted into a crosslinked product according to a conventional crosslinking method.

The vinylidene fluoride-acrylic acid ester copolymer of this invention provides an elastomer superior not only in heat resistance, ozone resistance and sour gasoline resistance but also in resistance to gasoline permeation and therefore can be used in fuel hoses of automobiles; hoses which contact with fuels, hydraulic oils, lubricating oils, etc.; diaphrgams; and various seals such as gaskets, O-rings, oil seals and the like. The copolymer can further be used in those rolls, transmission belts, conveyor belts, etc. for iron manufacture, spinning, printing, paper making, dyeing, etc. which require oil resistance and solvent resistance. Furthermore, the copolymer of this invention is suitable as a coating material utilizing the characteristics that the copolymer can give a film- or sheet-shaped article which is tough and superior in solvent resistance, weather resistance, transparency, flexibility and low temperature resistance.

This invention is more specifically described by the following Examples. However, these Examples are not given for the purpose of limitation but of illustration.

In the Examples, part and % are by weight unless otherwise specified.

EXAMPLES 1 TO 4

To a stainless steel autoclave having an internal volume of 500 ml equipped with a magnetic stirrer were fed 250 g of deionized, deoxygenated water, 1.25 g of F Top EF-204 (a trade name of Shin Akita Kasei K. K. for perfluoroalkylcarboxylic acid salt type surfactant) and 0.625 g of ammonium persulfate. The autoclave was thoroughly purged with nitrogen.

Then, the monomers shown in Table 1 were fed to the autoclave and copolymerized at 90° C. for 4 hours with stirring. The pressures at the start of polymerization and 4 hours after the start are shown in Table 1.

After completion of the reaction, the autoclave contents were cooled to room temperature; the unreacted monomers were discharged; and the resulting latex-like contents were taken out of the autoclave. The latex was coagulated by an aqueous calcium chloride solution. The resulting crumb-like polymer was water-washed, dried at 50° C. under vacuum and then subjected to yield measurement and various analyses. The results are shown in Table 1. In Table 1, the vinylidene fluoride content in the polymer was determined by determining the amount of fluorine contained in the polymer according to the flask combustion method. Glass transition temperature (Tg) and melting point (Tm) were measured by differential scanning calorimetry (DSC), at a temperature elevation rate of 20° C./min. The Tg was corrected on the basis of the value obtained when the Tg of polystyrene was taken as 100° C. and the Tg of SBR 1500 was taken as $-64°$ C. The Tm was corrected on the basis of the value obtained when the Tm of benzoic acid was taken as 127.4° C. and the Tm of chloroform was taken as $-63.5°$ C. The intrinsic viscosity $[\eta]$ was a value as measured at 30° C. in N,N-dimethylformamide. The solubility was determined by dissolving 1 g of a polymer in 100 ml of a solvent, filtering the solution through a 100 mesh wire net and measuring the amount of the residue on the wire net.

EXAMPLES 5 TO 9 AND COMPARATIVE EXAMPLES 1 TO 2

To a stainless steel autoclave having an internal volume of 3 liters equipped with a magnetic stirrer were fed 1,250 g of deionized, deoxygenated water, 6.25 g of F Top EF-204 and 3.125 g of ammonium persulfate. The autoclave was thoroughly purged with nitrogen. Thereto were fed the monomers shown in Table 1. The contents in the autoclave were then subjected to copolymerization, post-treatments and analyses in the same manner as in Examples 1 to 4. The results are shown in Table 1.

As is clear from Table 1, each copolymer of this invention has a single Tg, and the Tm and solubility thereof are quite different from those of a vinylidene fluoride homopolymer and an ethyl acrylate-acrylic acid copolymer.

Shown in FIG. 1 is an infrared absorption spectrum of the vinylidene fluoride-acrylic acid ester copolymer produced in Example 5. This infrared absorption spectrum shows at 1080 cm$^{-1}$ a characteristic absorption due to the stretching vibration of the C—F bond of vinylidene fluoride and at 1730 cm$^{-1}$ a characteristic absorption due to the stretching vibration of the C=O bond of ester, from which it is confirmed that the copolymer of Example 5 had these two bonds.

The DSC chart of the vinylidene fluoride-acrylic acid ester copolymer of Example 5 is shown in FIG. 2. The chart shows a single sharp peak of a glass transition temperature at $-22°$ C. This implies that the copolymer of Example 5 is a single copolymer.

The vinylidene fluoride-acrylic acid ester copolymer of Example 5, which had a Mooney viscosity ML$_{1+4}$ (100° C.) of 82, was pressed at 100° C. for 5 minutes to obtain a sheet. The sheet was a very transparent, light yellow and tough sheet having a surface hardness of 53 as measured by a Wallace hardness tester.

The sheet was repressed at 200° C. for 5 minutes but did not show any change in state such as hardness increase, etc.

The copolymer of this invention gives a tough sheet or film having an excellent transparency and flexibility, as compared with a blend of a vinylidene fluoride polymer and an acrylic copolymer as shown in the following Comparative Example 3.

COMPARATIVE EXAMPLE 3

The latex of Comparative Example 1 and the latex of Comparative Example 2 were mixed so that the vinylidene fluoride content in the mixed polymer became 38%. The resulting latex mixture was subjected to coagulation, water washing and drying in the same manner as in Examples 1 to 4 to obtain a blend polymer. This blend polymer had two Tg's at $-28.5°$ C. and $-56°$ C. and a Tm at 153° C. It had a Mooney viscosity ML$_{1+4}$ (100° C.) of 56.

The blend polymer was pressed at 100° C. for 5 minutes to obtain a sheet. The sheet was opaque white and had no transparency. The sheet had a surface hardness of 45 as measured by a Wallace hardness tester and was limp.

The above sheet was repressed for 5 minutes at 200° C. which is higher than the Tm of vinylidene fluoride homopolymer. The repressed sheet was also opaque white but had an increased surface hardness of 89 and was a hard, resinous sheet.

TABLE 1

| Example No. | Monomers fed | | | | | Polymerization Pressure (kg/cm$^2$G) | | Polymer yield | |
|---|---|---|---|---|---|---|---|---|---|
| | VDF (g) | EA (g) | AA (g) | BA (g) | MEA (g) | At start | At end | (g) | (%) |
| Example | | | | | | | | | |
| 1 | 48 | 5 | 0 | 0 | 0 | 48 | 43 | 14.7 | 27.7 |
| 2 | 60 | 10 | 0 | 0 | 0 | 58 | 52 | 21.0 | 30.0 |
| 3 | 45 | 14.5 | 0 | 0 | 0 | 45 | 40 | 19.0 | 31.9 |

TABLE 1-continued

| | | | | | | | | |
|---|---|---|---|---|---|---|---|---|
| 4 | 25 | 24.5 | 0.5 | 0 | 0 | 24 | 21 | 20.8 | 41.6 |
| 5 | 218 | 47.5 | 2.5 | 0 | 0 | 37 | 33 | 68.0 | 25.4 |
| 6 | 245 | 10 | 2.5 | 0 | 0 | 46 | 40 | 50.0 | 19.4 |
| 7 | 70 | 175 | 2.5 | 0 | 0 | 11 | 9 | 190.9 | 77.1 |
| 8 | 208 | 0 | 2.5 | 47.5 | 0 | 36 | 32 | 67.6 | 26.2 |
| 9 | 199 | 0 | 2.5 | 0 | 47.5 | 35 | 32 | 67.5 | 27.1 |
| Comparative Example | | | | | | | | | |
| 1 | 250 | 0 | 0 | 0 | 0 | 41 | 2 | 227.5 | 91.0 |
| 2 | 0 | 247.5 | 2.5 | 0 | 0 | 0 | 0 | 230.8 | 92.3 |

Polymer analysis

| VDF content (%) | $T_g$ (°C.) | $T_m$ (°C.) | Solubility (residue on 100 mesh wire net) (%) | | | $[\eta]_{DMF}^{30°C.}$ (g/dl) |
|---|---|---|---|---|---|---|
| | | | THF (room temp.) | DMF (room temp.) | DMF (60° C.) | |
| 66 | −13.5 | 39.5 | 84.0 | 59.0 | 0 | 0.17 |
| 54 | −19 | 35 | 78.4 | 58.0 | 0 | 0.15 |
| 24 | −26.5 | 54 | 63.0 | 28.0 | 0 | 0.77 |
| 13 | −26 | Not definite | 54.2 | 33.9 | 0.3 | 2.37 |
| 38 | −22 | 45 | 78.6 | 65.7 | 0.5 | 0.57 |
| 80 | −10.5 | 38.5 | 86.0 | 61.0 | 0.5 | 0.19 |
| 7 | −28.0 | Not definite | 48.3 | 22.3 | 0 | 2.53 |
| 28 | −53 | 47 | 62.2 | 50.6 | 0.4 | 0.52 |
| 26 | −42.5 | 43 | 73.0 | 61.2 | 0.7 | 0.61 |
| 100 | −55.5 | 154 | 80.2 | 0 | 0 | 0.57 |
| 0 | −28 | No | 0 | 0 | 0 | 2.82 |

Note:
VDF = Vinylidene fluoride
EA = Ethyl acrylate
AA = Acrylic acid
BA = n-Butyl acrylate
MEA = 2-Methoxyethyl acrylate

EXAMPLES 10 TO 12 AND COMPARATIVE EXAMPLES 4 TO 7

Each of the copolymers of Examples 5, 6 and 9 (hereinafter referred to as F/A copolymers), the blend copolymer of Comparative Example 3 (hereinafter referred to as F/A blend), the acrylic copolymer of Comparative Example 2 (hereinafter referred to as AR), a butadiene-acrylonitrile rubber (JSR N220S manufactured by Japan Synthetic Rubber Co., Ltd.; acrylonitrile content=41%; hereinafter referred to as NBR) and a hydrogenated butadiene-acrylonitrile rubber (Zetpol 1020 manufactured by Nippon Zeon Co., Ltd.; acrylonitrile content=45%; iodine value=25; hereinafter referred to as H-NBR) was mixed with other materials according to the compounding recipe shown in Table 2 and then press-cured under the conditions shown in Table 2 to obtain a crosslinked rubber sheet.

The sheet was tested for resistance to gasoline permeation according to the following test method.

100 ml of Fuel C [a 1:1 (by volume) mixture of toluene and isooctane] was placed in a stainless steel cup having an internal volume of about 120 ml. The cup was covered with a crosslinked rubber sheet. The sheet was tightened with a stainless steel ring and no leakage of Fuel C was confirmed. Then, the cup was turned upside down in order for Fuel C to directly contact with the corsslinked rubber sheet. In this state, the cup was allowed to stand. The amount of Fuel C liberated through the crosslinked rubber sheet was obtained by measuring the change of cup weight.

The measurement was conducted at 20° C. for 7 days. Using a weight decrease from the 4th day to the 7th day (this is a period showing a linear weight decrease), there was calculated a gasoline permeation coefficient per unit area, unit thickness and unit time. The results are shown in Table 2.

It is clear from Table 2 that the copolymers of this invention have excellent resistance to gasoline permeation.

TABLE 2

| | Example No. | | | | | | |
|---|---|---|---|---|---|---|---|
| | Examples | | | Comparative Examples | | | |
| Type of polymer | 10 F/A copolymer | 11 F/A copolymer | 12 F/A copolymer | 4 F/A Blend | 5 AR | 6 NBR | 7 H—NBR |
| Compounding recipe (parts) | | | | | | | |
| Polymer | 100 | 100 | 100 | 100 | 100 | 100 | 100 |
| Zinc white | | | | | | 5 | 5 |
| Stearic acid | 1 | 1 | 1 | 1 | 1 | 1 | 1 |
| HAF black | 25 | 25 | 25 | 25 | 25 | | |
| FEF black | | | | | | | 60 |
| SRF black | | | | | | 70 | |
| TP-95*1 | | | | | | 10 | 10 |
| Dodecylammonium bromide | 1 | 1 | 1 | 1 | 1 | | |
| Diphenylurea | 2 | 2 | 2 | 2 | 2 | | |
| Nocceler BG*2 | 1 | 1 | 1 | 1 | 1 | | |
| Accelerator TMTD*3 | | | | | | 1.5 | 1.5 |
| Accelerator CBS*4 | | | | | | 2.5 | |

TABLE 2-continued

| | Example No. | | | | | | |
|---|---|---|---|---|---|---|---|
| | Examples | | | Comparative Examples | | | |
| Type of polymer | 10 F/A co-polymer | 11 F/A co-polymer | 12 F/A co-polymer | 4 F/A Blend | 5 AR | 6 NBR | 7 H—NBR |
| Accelerator MBT*[5] | | | | | | | 0.5 |
| Accelerator TETD*[6] | | | | | | | 1.0 |
| Epicoat 152*[7] | 2 | 2 | 2 | 2 | 2 | | |
| Sulfur | | | | | | 0.5 | 0.5 |
| (Total) | (132) | (132) | (132) | (132) | (132) | (190.5) | (179.5) |
| Crosslinking conditions (Press cure) | | | | | | | |
| Temp. (°C.) | 160 | 160 | 160 | 160 | 160 | 160 | 160 |
| Time (min) | 30 | 30 | 30 | 30 | 30 | 20 | 20 |
| Gasoline permeation coefficient (g · mm/m² · 24 hr) | 156 | 21 | 187 | 288 | 756 | 259 | 285 |

Note:
*[1] Dibutoxyethoxyethyl adipate, manufactured by Thiokol Chemical Corp.
*[2] 1-o-Tolylbiguanide, manufactured by Ohuchi Shinko Kagaku Kogyo K.K.
*[3] Tetramethylthiuram disulfide
*[4] N-cyclohexyl-2-benzothiazylsulfenamide
*[5] 2-Mercaptobenzothiazole
*[6] Tetraethylthiuram disulfide
*[7] Epoxy resin of polyfunctional novolak type, manufactured by Yuka Shell Epoxy K.K.

EXAMPLES 13 TO 15 AND COMPARATIVE EXAMPLE 8

The same procedure as in Examples 5 to 9 was repeated, except that the monomers shown in Table 3 were substituted for the monomers in Examples 5 to 9 to obtain the results shown in Table 3.

From Table 3, it can be seen that each of the copolymers of this invention has a single Tg and is quite different in Tm and solubility from a vinylidene fluoride homopolymer or an ethyl acrylate-vinyl chloroacetate copolymer.

Also, the infrared absorption spectrum of the vinyldiene fluoride-acrylic acid ester copolymer produced in Example 13 shows at 1080 cm$^{-1}$ a characteristic absorption due to the stretching vibration of the C—F bond of vinylidene fluoride and at 1730 cm$^{-1}$ a characteristic absorption due to the stretching vibration of the C=O bond of the ester, from which it is confirmed that the copolymer of Example 13 had these two bonds.

Furthermore, the DSC chart of the vinylidene fluoride-acrylic acid ester copolymer of Example 13 shows a single sharp peak of a glass transition temperature at −15.5° C. This implies that the copolymer of Example 13 is a single copolymer. The Mooney viscosity $ML_{1+4}$ (100° C.) of this copolymer was 75.

TABLE 3

| | Item | | | | | | |
|---|---|---|---|---|---|---|---|
| | Monomers fed | | | Polymerization Pressure (kg/cm²G) | | Polymer yield | |
| Example No. | VDF (g) | EA (g) | CVA (g) | At start | At end | (g) | (%) |
| Example | | | | | | | |
| 13 | 162.5 | 83.1 | 4.4 | 42 | 35 | 127.8 | 51.1 |
| 14 | 68.0 | 177.5 | 4.5 | 13 | 10 | 187.5 | 75.0 |
| 15 | 242.0 | 23.5 | 4.5 | 50 | 44 | 54.5 | 20.2 |
| Comparative Example 8 | 0 | 237.5 | 12.5 | 0 | 0 | 238.8 | 95.5 |

| | Polymer analysis | | | | | |
|---|---|---|---|---|---|---|
| VDF content (%) | Tg (°C.) | Tm (°C.) | Solubility (residue on 100 mesh wire net) (%) | | | $[\eta]_{DMF}^{30°\,C.}$ (g/dl) |
| | | | TMF (room temp.) | DMF (room temp.) | DMF (60° C.) | |
| 32 | −15.5 | 114.5 | 67.0 | 31.0 | 0 | 0.57 |
| 13 | −19.2 | Not definite | 50.3 | 23.5 | 0 | 2.48 |
| 78 | −5.0 | 38 | 87.0 | 60.0 | 1.0 | 0.18 |
| 0 | −28 | No | 0 | 0 | 0 | 3.51 |

Note:
VDF = Vinylidene fluoride
EA = Ethyl acrylate
CVA = Vinyl chloroacetate

COMPARATIVE EXAMPLE 9

The latex of Comparative Example 1 was mixed with the latex of Comparative Example 8 so that the vinylidene fluoride (VDF) content in the copolymer became 32%, and the resulting mixture was subjected to coagulation, water-washing and drying in the same manner as in Examples 1 to 4 to obtain a blend polymer. This blend polymer had two Tg's at −28.5° C. and −56° C. and a Tm at 149° C. It had a Mooney viscosity $ML_{1+4}$ (100° C.) of 57.

EXAMPLES 16 AND 17 AND COMPARATIVE EXAMPLE 10

Each of the F/A copolymers of Examples 13 and 15 and the F/A blend polymer of Comparative Example 9 was mixed with other materials according to the compounding recipe shown in Table 4 and then press-cured under the conditions shown in Table 4 to obtain a crosslinked rubber sheet. The sheet was tested for resistance to gasoline permeation in the same manner as in Examples 10 to 12 and Comparative Examples 4 to 7. The results obtained are shown in Table 4.

From Table 4, it can be seen that the copolymers of this invention have excellent resistance to gasoline permeation.

TABLE 4

|  | Example No. | | |
| --- | --- | --- | --- |
|  | Examples | | Comp. |
|  | 10 | 11 | Ex. 10 |
| Type of polymer | F/A copolymer | F/A copolymer | F/A Blend |
| Compounding recipe (parts) | | | |
| Polymer | 100 | 100 | 100 |
| Stearic acid | 1 | 1 | 1 |
| HAF black | 10 | 10 | 10 |
| Sodium stearate | 2.5 | 2.5 | 2.5 |
| Potassium stearate | 0.5 | 0.5 | 0.5 |

TABLE 4-continued

|  | Example No. | | |
| --- | --- | --- | --- |
|  | Examples | | Comp. |
|  | 10 | 11 | Ex. 10 |
| Sulfur (Total) | 0.3 (114.3) | 0.3 (114.3) | 0.3 (114.3) |
| Crosslinking conditions (Press cure) | | | |
| Temp. (°C.) | 170 | 170 | 170 |
| Time (min) | 30 | 30 | 30 |
| Gasoline permeation coefficient (g · mm/m$^2$ · 24 hr) | 195 | 25 | 353 |

What is claimed is:

1. A crosslinkable rubber composition having excellent resistance to gasoline permeation comprising, as essential components, a crosslinking agent and a polymer obtained by polymerizing in the presence of a radical polymerization initiator a mixture of
   (A′) 27–95% by weight of vinylidene fluoride,
   (B′) 4.9–89.9% by weight of an alkyl acrylate, an alkoxy-substituted alkyl acrylate or both of them, and
   (C′) 0.1–10% by weight of a crosslinking monomer.

2. The crosslinkable rubber composition according to claim 1, wherein the crosslinking monomer (C′) is at least one monomer selected from the group consisting of active halogen-containing ethylenically unsaturated monomers and carboxyl group-containing ethylenically unsaturated monomers.

* * * * *